US012737474B1

(12) United States Patent
Choi

(10) Patent No.: US 12,737,474 B1
(45) Date of Patent: Sep. 15, 2026

(54) ELECTRONIC DEVICE AND METHOD FOR AUTHENTICATING SECURITY STATE OF CHIPLET

(71) Applicant: Rebellions Inc., Seongnam-si (KR)

(72) Inventor: Myunghoon Choi, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 19/380,837

(22) Filed: Nov. 5, 2025

(30) Foreign Application Priority Data

Aug. 22, 2025 (KR) ........................ 10-2025-0116996

(51) Int. Cl.

| | |
|---|---|
| ***G06F 21/57*** | (2013.01) |
| ***G06F 9/4401*** | (2018.01) |
| ***G06F 21/60*** | (2013.01) |
| ***G06F 21/62*** | (2013.01) |

(52) U.S. Cl.
CPC .......... *G06F 21/575* (2013.01); *G06F 9/4401* (2013.01); *G06F 21/602* (2013.01); *G06F 21/62* (2013.01)

(58) Field of Classification Search
CPC .... G06F 21/575; G06F 9/4401; G06F 21/602; G06F 21/62
See application file for complete search history.

(56) References Cited

U.S. PATENT DOCUMENTS

2021/0312057 A1* 10/2021 Kloth .................... G06F 21/575
2025/0045057 A1* 2/2025 Raghuraman ......... G06F 9/4401
2025/0068521 A1 2/2025 Choi et al.

FOREIGN PATENT DOCUMENTS

CN 102929719 A * 2/2013
KR 10-2020-0020627 A 2/2020
KR 20200020627 A * 2/2020 ............ G06F 21/33
KR 10-2025-0030946 A 3/2025
KR 10-2025-0073608 A 5/2025

OTHER PUBLICATIONS

Office Action for KR 10-2025-0116996 by Ministry of Intellectual Property dated Nov. 19, 2025.

* cited by examiner

*Primary Examiner* — Chad G Erdman
(74) *Attorney, Agent, or Firm* — BROADVIEW IP LAW, PC

(57) ABSTRACT

According to one or more embodiments of the present disclosure, an electronic device for authenticating a security state of a chiplet, includes: a first chiplet and one or more second chiplets connected to each other by a first interface; wherein each of the first chiplet and the one or more second chiplets includes a first bootloader executed when starting a boot process and an immutable memory that is programmed one-time, wherein the immutable memory stores a security key and a second bootloader executed by the first bootloader, and wherein each of the first chiplet and the one or more second chiplets is configured to attest a security state by signing using the security key in response to a request for attestation of the security state from an external device.

18 Claims, 11 Drawing Sheets

100
Chiplet
2000
Normal Domain
2100
PCIe subsystem
2200
UCIe subsystem
2500
Mailbox
2600
Memory
(SRAM)
2400
Neural Network
Hardware Engines
(NPU)
2300
Normal
Core
(CPU)
1000
Secure Domain
1400
Security
Hardware
Engines
1500
Memory
(SRAM)
1300
Immutable
Memory
(OTP)
1100
Security Core
1200
First
Bootloader 20
Host Device 100_1
Chiplet-1
S110
Execute first bootloader
S120
Verify second bootloader 100_2 ~ 100~4
Chiplet-2 ~ Chiplet-4
S110
Execute first bootloader
S120
Verify second bootloader 20
Host Device
100_1
Chiplet-1
100_2 ~ 100~4
Chiplet-2 ~ Chiplet-4
S410
Request attestation of third security state of electronic device
S420
Generate and transfer third security state information
S430
Verify third security state information
S440
Verification is successful?
Yes
No
S451
Connection to Host Device is permitted
S452
Connection to Host Device is denied

ELECTRONIC DEVICE AND METHOD FOR AUTHENTICATING SECURITY STATE OF CHIPLET

CROSS-REFERENCE TO RELATED APPLICATION

This application is based on and claims the benefit of priority to Korean Patent Application No. 10-2025-0116996, filed Aug. 22, 2025, the aforementioned priority application being hereby incorporated by reference in its entirety.

TECHNICAL FIELD

The present disclosure relates to an electronic device and method for authenticating a security state of a chiplet, and more particularly, to a technology for authenticating a security state during a boot process of a chiplet to enhance the security of a chiplet-based device or system.

BACKGROUND

Recently, with the development of semiconductor technology, as the demand for high performance and high integration has increased, chiplet architecture has been drawing attention. The chiplet architecture is a structure in which functionally separated dies are integrated into a single package, instead of integrating all functions on one large die, and performs communication between dies through a standard interface such as a silicon interposer or Universal Chiplet Interconnect Express (UCIe). By utilizing the chiplet architecture, it is possible to overcome reticle limits, improve the yield of chiplets, and reduce development costs through the reuse of chiplets.

However, a chiplet-based system often includes heterogeneous chiplets supplied from different vendors, and at this time, there is a problem that it is difficult to fully trust the security of each chiplet in advance. In addition, if a specific chiplet is maliciously altered or integrated into the system with an unintended security vulnerability, the integrity and reliability of the entire system may be compromised. This can lead to serious security threats such as user data leakage, system malfunction, and malicious code execution.

To prevent these security threats, an authentication procedure for verifying the integrity and reliability of each chiplet is required in the booting process of the chiplet-based system.

SUMMARY

An object of the present disclosure is to ensure the integrity and reliability of a chiplet-based device or system by verifying the security state of a chiplet during the boot process of the chiplet-based device or system.

Another object of the present disclosure is to verify the security state of each chiplet by introducing the concepts of a verifier chiplet and an attester chiplet.

Another object of the present disclosure is for the verifier chiplet to also function as an attester chiplet for the chiplet system, thereby verifying the security state of the entire chiplet system.

The technical problems to be solved in the present disclosure are not limited to the technical problems mentioned above, and various unmentioned technical problems may be inferred by those skilled in the art from the present disclosure.

According to one or more embodiments of the present disclosure, an electronic device for authenticating a security state of a chiplet, includes: a first chiplet and one or more second chiplets connected to each other by a first interface; wherein each of the first chiplet and the one or more second chiplets includes a first bootloader executed when starting a boot process and an immutable memory that is programmed one-time, wherein the immutable memory stores a security key and a second bootloader executed by the first bootloader, and wherein each of the first chiplet and the one or more second chiplets is configured to attest a security state by signing using the security key in response to a request for attestation of the security state from an external device.

In one or more embodiments, each of the first chiplet and the one or more second chiplets is further configured to: execute the first bootloader when starting the boot process; and by the first bootloader, load the second bootloader and perform an integrity verification on the second bootloader.

In one or more embodiments, if the integrity verification is successful in each of the first chiplet and the one or more second chiplets, the first chiplet is further configured to perform a first verification on a first security state of each of the one or more second chiplets.

In one or more embodiments, the first verification is performed in a manner in which: the first chiplet requests an attestation of the first security state to each of the one or more second chiplets, in response to the request from the first chiplet, each of the one or more second chiplets generates first security state information based on the security key and transfers it to the first chiplet, and the first chiplet verifies the first security state information.

In one or more embodiments, the first security state information includes at least one of a chiplet unique identifier, a certificate, firmware information, booting information, version information, or a security configuration of each of the one or more second chiplets.

In one or more embodiments, the first chiplet is further configured to: if the first verification is successful, allow each of the one or more second chiplets to continue the boot process, and if the first verification fails, disable the first interface, stop the boot process, and transmit log information about the boot failure to a host device.

In one or more embodiments, during the continuation of the boot process, each of the first chiplet and the one or more second chiplets loads a boot firmware by the second bootloader, and the first chiplet is further configured to perform a second verification on a second security state of the boot firmware executed in each of the one or more second chiplets.

In one or more embodiments, the second verification is performed in a manner in which: the first chiplet requests an attestation of the second security state to each of the one or more second chiplets, in response to the request from the first chiplet, each of the one or more second chiplets generates second security state information based on the security key and transfers it to the first chiplet, and the first chiplet verifies the second security state information.

In one or more embodiments, the second security state information includes at least one of runtime information or integrity information of the boot firmware.

In one or more embodiments, the first chiplet is further configured to: if the second verification is successful, allow each of the one or more second chiplets to complete the boot process, and if the second verification fails, disable the first interface, stop the boot process, and transmit log information about the boot failure to the host device.

In one or more embodiments, the first chiplet is connected to the host device by a second interface, and after the boot process is completed, in response to a request for attestation of a third security state of the electronic device from the host device, the first chiplet is further configured to generate third security state information based on the security key and transmit it to the host device.

According to one or more embodiments of the present disclosure, in a method for authenticating a security state of a chiplet by an electronic device, the electronic device includes a first chiplet and one or more second chiplets connected to each other by a first interface, each of the first chiplet and the one or more second chiplets includes a first bootloader executed when starting a boot process and an immutable memory that is programmed one-time, the immutable memory stores a security key and a second bootloader executed by the first bootloader, and the method includes: by each of the first chiplet and the one or more second chiplets, executing the first bootloader and performing an integrity verification on the second bootloader; if the integrity verification is successful, by the first chiplet, performing a first verification on a first security state of each of the one or more second chiplets; if the first verification is successful, by the first chiplet, performing a second verification on a second security state of a boot firmware executed in each of the one or more second chiplets; and if the second verification is successful, by a host device connected to the first chiplet by a second interface, performing a third verification on a third security state of the electronic device.

In one or more embodiments, the performing the first verification includes: by the first chiplet, requesting an attestation of the first security state to each of the one or more second chiplets; in response to the request from the first chiplet, by each of the one or more second chiplets, generating first security state information based on the security key and transferring it to the first chiplet; and by the first chiplet, verifying the first security state information.

In one or more embodiments, the method further includes, after the performing the first verification: if the first verification is successful, by the first chiplet, allowing each of the one or more second chiplets to continue the boot process; and if the first verification fails, by the first chiplet, disabling the first interface, stopping the boot process, and transmitting log information about the boot failure to the host device.

In one or more embodiments, the performing the second verification includes: by the first chiplet, requesting an attestation of the second security state to each of the one or more second chiplets; in response to the request from the first chiplet, by each of the one or more second chiplets, generating second security state information based on the security key and transferring it to the first chiplet; and by the first chiplet, verifying the second security state information.

In one or more embodiments, the method further includes, after the performing the second verification: if the second verification is successful, by the first chiplet, allowing each of the one or more second chiplets to complete the boot process; and if the second verification fails, by the first chiplet, disabling the first interface, stopping the boot process, and transmitting log information about the boot failure to the host device.

In one or more embodiments, the performing the third verification includes: by the host device, requesting an attestation of the third security state of the electronic device to the first chiplet; in response to the request from the host device, by the first chiplet, generating third security state information based on the security key and transferring it to the host device; and by the host device, verifying the third security state information.

In one or more embodiments, the method further includes, after the performing the third verification: if the third verification is successful, by the host device, allowing a connection between the electronic device and the host device; and if the third verification fails, by the host device, denying the connection between the electronic device and the host device.

According to embodiments of the present disclosure, it is possible to ensure the integrity and reliability of a chiplet-based device or system by verifying the security state during the boot process of the chiplet-based device or system.

According to embodiments of the present disclosure, it is possible to verify the security state of each chiplet by introducing the concepts of a verifier chiplet and an attester chiplet.

According to embodiments of the present disclosure, the verifier chiplet can also function as an attester chiplet for the chiplet system, thereby verifying the security state of the entire chiplet system.

The effects according to the technical idea of the present disclosure are not limited to the effects mentioned above, and various unmentioned effects can be clearly understood by those skilled in the art from the present disclosure.

BRIEF DESCRIPTION OF THE DRAWINGS

Embodiments will be more clearly understood from the following detailed description taken in conjunction with the accompanying drawings in which.

DETAILED DESCRIPTION

Figure 1:
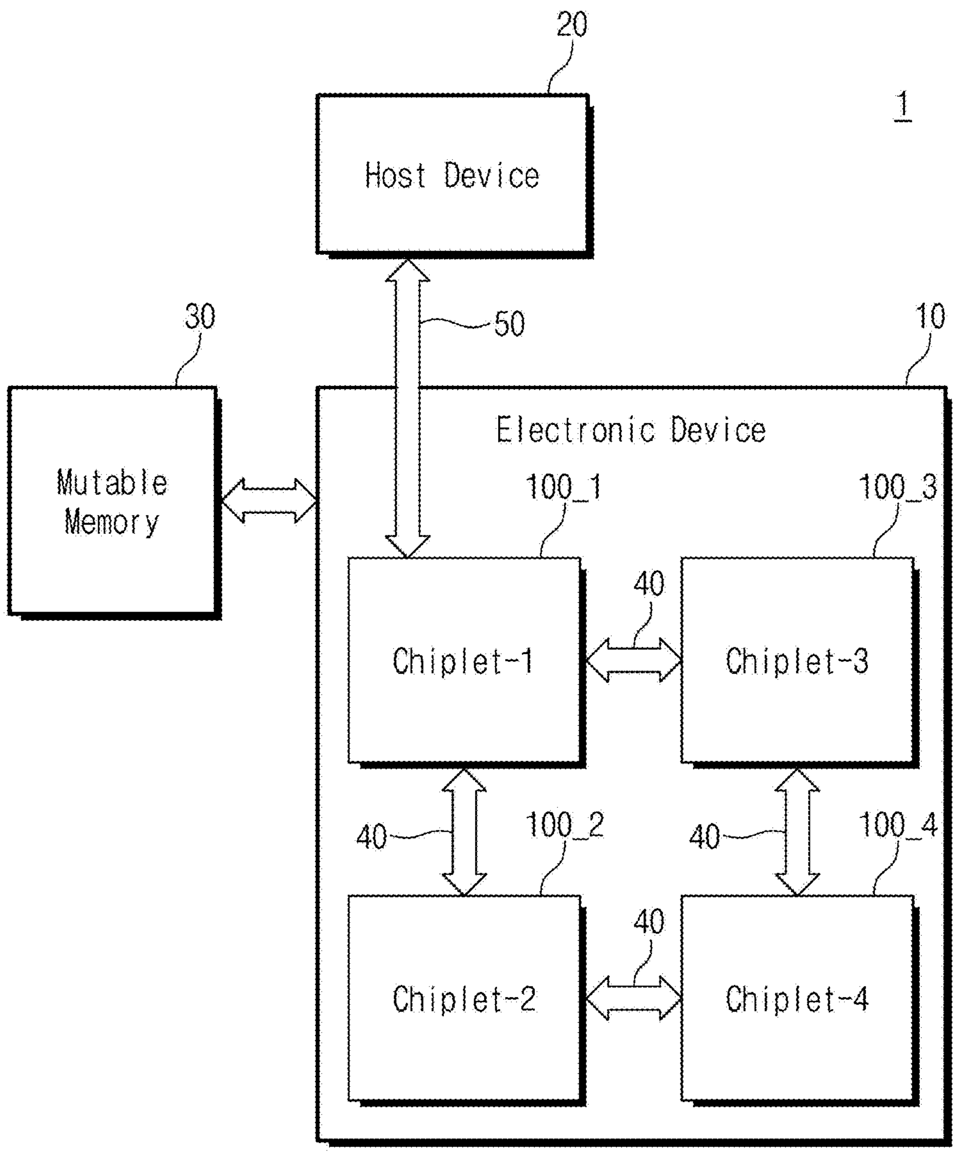
FIG. 1 is a diagram for explaining a system including an electronic device including a plurality of chiplets and a host device according to embodiments of the present disclosure.

Hereinafter, specific embodiments of the present disclosure will be described in detail with reference to the accompanying drawings. In the present specification, specific descriptions of well-known functions or configurations are omitted when there is a concern that they may unnecessarily complicate or obscure the essence of the present disclosure.

The advantages, features, and achieving methods of the disclosed embodiments will be clearly understood by referring to the accompanying drawings and the embodiments described later. However, the present disclosure is not limited to these embodiments and can be implemented in various forms. These embodiments are examples provided to help the overall understanding of the present disclosure and are not intended to limit the scope of the present disclosure.

In the accompanying drawings, identical or similar components are given identical reference numerals. In addition, when describing embodiments of the present disclosure, descriptions of identical or similar components may be omitted to avoid duplicate descriptions. However, this omission of description is not intended to mean that the corresponding component is not included in a particular embodiment.

The terms used in this specification fully reflect the functions of the invention and have been selected from terms currently generally used in the art, but these may vary depending on the views of those skilled in the relevant field or new technological developments. In addition, in specific cases, there may be terms arbitrarily selected by the applicant, and in this case, their meaning will be described in detail in the specification. Therefore, the terms in this specification should be interpreted based on their meaning and the overall context of the present disclosure, rather than merely as names.

When a term is expressed in the singular in this specification, it may also include a plural meaning unless explicitly limited to the singular. Conversely, when expressed in the plural, it may be interpreted as singular in context unless explicitly limited to plural. Throughout the specification, when a specific part is said to include a certain component, this means that additional components may be included, rather than excluding other components.

In this specification, the expression "each of a plurality of A" or "a plurality of A each" may refer to each of all elements included in a plurality of A, or may refer to each of some elements of a plurality of A.

In this specification, the expression "one or more A" or "at least one A" may mean a set of one or more of A unless clearly expressed otherwise in context.

The expressions "may include," "may be provided with," "may have," etc., used in this specification mean the existence of a corresponding feature (e.g., function, operation, or component, etc.) and do not exclude the existence of additional other features. That is, these expressions should be understood as open-ended terms that allow for the inclusion of other embodiments.

The expression "configured to" as used herein may have meanings such as "set to," "having the capability to," "modified to," "made to," or "able to," depending on the context. This expression is not limited to "specifically designed in hardware," and for example, a processor configured to perform a specific operation may be a general-purpose processor capable of performing the operation through software execution, or a special-purpose computer structured through programming to perform the specific operation.

The terms "connect," "transmit," "send," "receive," etc., used in this specification may mean direct connection, transmission, sending, and reception between components, or may mean indirect connection, transmission, sending, and reception with other components interposed therebetween.

In the present disclosure, expressions such as "first," "second," etc., do not limit the order, importance, etc., of the components they modify unless clearly expressed otherwise in context. These expressions may be used to distinguish one component from another.

In the present disclosure, expressions such as "A, B, or C", "A, B, and/or C", "at least one of A, B, and C", "at least one of A, B, or C", "at least one of A, B, and/or C", "at least one selected from A, B, and C", "at least one selected from A, B, or C", and "at least one selected from A, B, and/or C" may mean each or all possible combinations thereof. For example, "at least one of A or B" may refer to at least one A, at least one B, or both at least one A and at least one B.

FIG. 1 is a diagram for explaining a system including an electronic device including a plurality of chiplets and a host device according to embodiments of the present disclosure.

Referring to FIG. 1, a system 1 according to embodiments of the present disclosure may include an electronic device 10 and a host device 20.

The electronic device 10 may be an electronic device that communicates with the host device 20 and provides functions according to commands from the host device 20. For example, the electronic device 10 may be a device specialized in the operations of an artificial neural network model, such as an artificial neural network accelerator. The electronic device 10 may perform parallel processing for at least some functions of the host device 20. The electronic device 10, as a chiplet system including first to fourth chiplets 100_1 to 100_4, may distribute tasks, which are according to a command from the host device 20, to the first to fourth chiplets 100_1 to 100_4 and process the tasks in parallel, according to the command from the host device 20.

The host device 20 is a general-purpose processor and may be, for example, a Central Processing Unit (CPU). Therefore, the host device 20 may request neural network operations to the electronic device 10 which includes a neural network operation processor such as a Neural Processing Unit (NPU). That is, the host device 20 may be a host that sends commands to the electronic device 10. The host device 20 may transmit a command stream to the electronic device 10 to instruct neural network operations. The host device 20 may receive neural network operation results from the electronic device 10.

Referring to FIG. 1, the system 1 according to embodiments of the present disclosure may further include a mutable memory 30. Although FIG. 1 shows the mutable memory 30 as being connected to the electronic device 10, the mutable memory 30 may be directly connected to a specific chiplet, for example, the first chiplet 100_1, depending on the configuration of the system 1.

The mutable memory 30 may be implemented, for example, as a flash memory. The mutable memory 30 may store application firmware or operating system software as a bootloader for the stage following the boot firmware. A first bootloader 1200 and/or a second bootloader 1320, which will be described later, may load the firmware or operating system software during the booting stage. Depending on the design choice, the application firmware or operating system software may be stored in the mutable memory 30, or in a memory inside the first to fourth chiplets 100_1 to 100_4.

Referring to FIG. 1, the electronic device 10 according to embodiments of the present disclosure may include a plurality of chiplets. A chiplet may be an individual integrated circuit, which is a semiconductor device that is combined or connected with external chiplets to form a single package.

That is, the electronic device 10 may be packaged in a form that includes a plurality of chiplets. For example, the electronic device 10 may include a first chiplet 100_1, a second chiplet 100_2, a third chiplet 100_3, and a fourth chiplet 100_4 as a plurality of chiplets. However, this is merely an example, and the electronic device 10 may include any number of chiplets. In the present disclosure, the first chiplet 100_1 may be referred to as a "first chiplet," and the second chiplet 100_2, the third chiplet 100_3, and the fourth chiplet 100_4 may be referred to as "one or more second chiplets."

Referring to FIG. 1, the first to fourth chiplets 100_1 to 100_4 may be arranged in a rectangular array within the electronic device 10, and the first to fourth chiplets 100_1 to 100_4 may be connected to and communicate with adjacent chiplets, respectively. However, this is merely an example, and the chiplets including the first to fourth chiplets 100_1 to 100_4 within the electronic device 10 may be arranged and interconnected in various forms such as linear, rectangular, or grid patterns.

The first to fourth chiplets 100_1 to 100_4 within the electronic device 10 may be connected to each other through a silicon interposer via methods such as wire bonding or Through Silicon Via (TSV). The configuration in which the first to fourth chiplets 100_1 to 100_4 are connected to each other will be described in detail with reference to FIG. 2.

Figure 2:
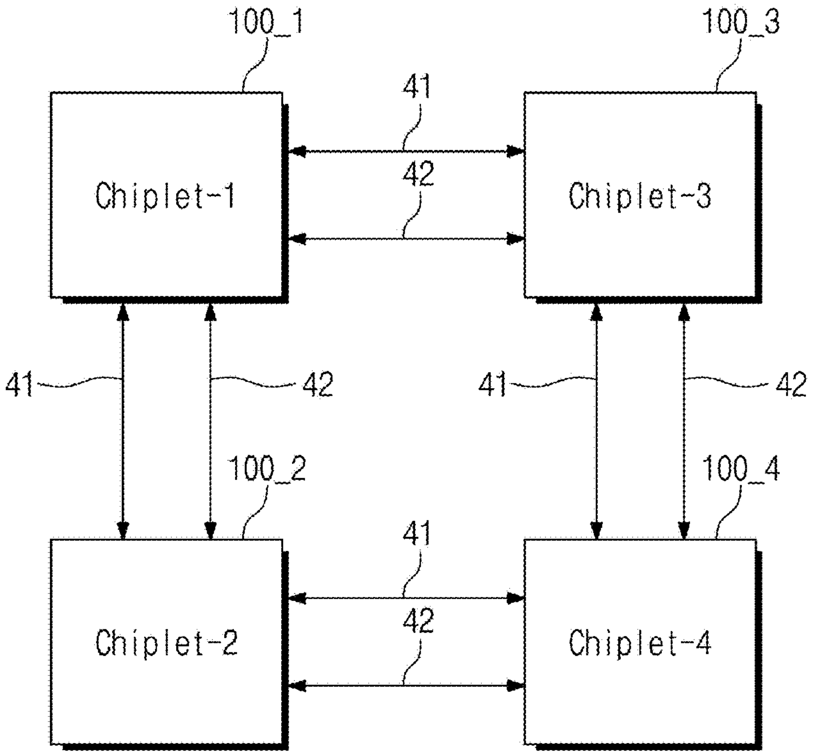
FIG. 2 is a diagram for explaining a first interface connecting a plurality of chiplets according to embodiments of the present disclosure.

FIG. 2 is a diagram for explaining a first interface connecting a plurality of chiplets according to embodiments of the present disclosure.

Referring to FIG. 1, the first to fourth chiplets 100_1 to 100_4 may be connected to each other by a first interface 40. In the present disclosure, the first interface 40 may refer to a plurality of first interfaces 40. Referring to FIG. 2, the first interface 40 may include a main interface 41 and a backup interface 42. The main interface 41 and the backup interface 42 may provide a dual-path structure to support inter-chiplet communication and the boot sequence.

Specifically, the main interface 41 is a die-to-die interface and may be implemented, for example, as a Universal Chiplet Interconnect Express (UCIe) interface. The UCIe interface can perform high-speed and bandwidth-scalable communication among multiple chiplets. Since the UCIe interface is activated only after being initialized by firmware during initial booting, it may not be directly usable before initialization. To solve this, the backup interface 42 is a die-to-die backup interface and may be implemented, for example, as a Serial Peripheral Interface Express (SPIe) interface. The SPIe interface can provide a low-speed and low-bandwidth communication path that is immediately available without a separate initialization process.

For example, the system 1 may have a configuration in which the mutable memory 30 is directly connected only to the first chiplet 100_1. In this case, only the first chiplet 100_1 may be able to directly access the application firmware stored in the mutable memory 30 at the initial booting time. Then, the second chiplet 100_2, the third chiplet 100_3, and the fourth chiplet 100_4 may not be able to initialize the main interface 41, which includes a UCIe interface, on their own. In such a situation, the backup interface 42 including the SPIe interface is activated, allowing the first chiplet 100_1 to transmit the application firmware read from the mutable memory 30 to the other chiplets, i.e., the second chiplet 100_2, the third chiplet 100_3, and the fourth chiplet 100_4. The second chiplet 100_2, the third chiplet 100_3, and the fourth chiplet 100_4 execute the application firmware received through the backup interface 42 to complete the initialization of the main interface 41, and thereafter, they can perform high-speed data communication and operation synchronization through the main interface 41.

Although the main interface 41 and the backup interface 42 have been described as including the UCIe interface and the SPIe interface, respectively, the present disclosure is not limited thereto and may include various interfaces such as Mobile Industry Processor Interface (MIPI), Inter-Integrated Circuit (I2C), Universal Asynchronous Receiver/Transmitter (UART), Universal Synchronous/Asynchronous Receiver/Transmitter (USART), Controller Area Network (CAN), Local Interconnect Network (LIN), Synchronous Serial Interface (SSI), etc. Furthermore, although the first interface 40 has been described as being divided into the main interface 41 and the backup interface 42, it is not limited thereto and may be configured in various ways within the scope of the problems to be solved by the present disclosure.

Referring back to FIG. 1, the first chiplet 100_1 of the electronic device 10 and the host device 20 may be connected by a second interface 50. The second interface 50 may provide an external communication path for data transmission/reception and control signal exchange between the first chiplet 100_1 and the host device 20. The second interface 50 may be implemented as one or more of various interfaces depending on the configuration of the system 1. The second interface 50 may include various interfaces, for example, Peripheral Component Interconnect Express (PCIe), Inter-Integrated Circuit (I2C), or System Management Bus (SMBus). Preferably, the second interface 50 may be implemented as the PCIe interface, which offers excellent high-speed and bandwidth scalability.

Specifically, the second interface 50 may support that the first chiplet 100_1 receives boot control commands, security verification requests, firmware, configuration data, etc., from the host device 20. In addition, the second interface 50 may support that the first chiplet 100_1 transmits its status information, attestation results of security status, operation logs, etc., to the host device 20. Furthermore, the second interface 50 may receive necessary configuration data from the host device 20 during initial booting to set the operating environment of the first chiplet 100_1, or support real-time status synchronization with the host device 20 during the operation of the system 1.

The first interface 40 and the second interface 50 may each be implemented as a circuit or circuitry.

Each of the first to fourth chiplets 100_1 to 100_4 according to embodiments of the present disclosure may be an artificial neural network accelerator that performs operations of an artificial neural network model. However, this is merely an example, and each of the first to fourth chiplets 100_1 to 100_4 may be a chiplet that performs various functions such as an artificial neural network accelerator, a CPU, an interface chip, a memory chip, etc. The configuration of the first to fourth chiplets 100_1 to 100_4 will be described in detail with reference to FIG. 3.

Figure 3:
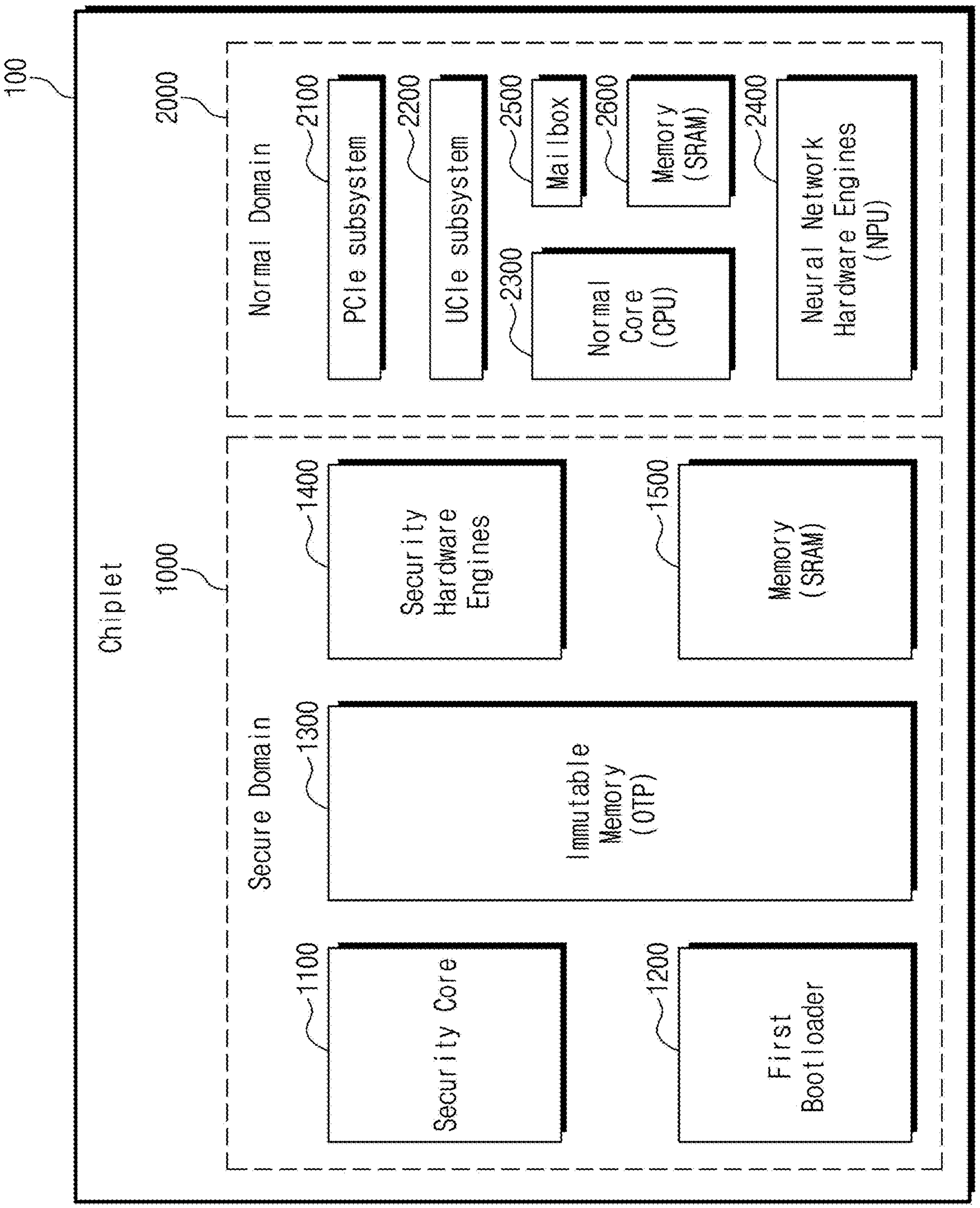
FIG. 3 is a diagram for explaining a configuration of a chiplet according to embodiments of the present disclosure.

FIG. 3 is a diagram for explaining a configuration of a chiplet according to embodiments of the present disclosure.

Each of the first to fourth chiplets 100_1 to 100_4 may be configured as a chiplet 100 shown in FIG. 3. Hereinafter, the description of the chiplet 100 may be applied equally or similarly to each of the first to fourth chiplets 100_1 to 100_4. However, the first to fourth chiplets 100_1 to 100_4 may be identical chiplets or different chiplets from one another. For example, among the first to fourth chiplets 100_1 to 100_4, the first chiplet 100_1, which communicates directly with the host device 20, necessarily includes a PCIe subsystem 2100, whereas the second chiplet 100_2, the third chiplet 100_3, and the fourth chiplet 100_4, which do not communicate directly with the host device 20, may optionally include the PCIe subsystem 2100. In addition, at least one of the first to fourth chiplets 100_1 to 100_4 may be a chiplet manufactured by a different manufacturer than the remaining chiplets.

Referring to FIG. 3, the chiplet 100 may include a secure domain 1000 and a normal domain 2000. Within the chiplet 100, the secure domain 1000 may be implemented as a separate security chip or security processor, and the normal domain 2000 may be implemented as a main chip or main processor. Alternatively, the secure domain 1000 and the normal domain 2000 may be implemented in a manner that they are separated by hardware within a single chiplet 100 or SoC.

The secure domain 1000 is a core block that forms a root of trust of the chiplet 100 and can perform tasks that require a high level of security, such as system booting, authentication, cryptographic operations, and key management. The secure domain 1000 can perform the attestation of security state, integrity verification of firmware, etc., through a security core 1100, an immutable memory 1300, etc. Access to the secure domain 1000 is fundamentally restricted from the outside, allowing for secure management of security-related resources. However, an interface that enables limited data exchange may be provided between the secure domain 1000 and the normal domain 2000.

The normal domain 2000 is a block that performs functions with relatively low security importance, such as application execution, data processing, and peripheral device control, and may include a high-performance processing core, general memory, input/output interfaces, etc. The normal domain 2000 can exchange data with the secure domain 1000 or request security services to the secure domain 1000 when necessary.

Referring to FIG. 3, the secure domain 1000 may include a security core 1100, a first bootloader 1200, an immutable memory 1300, security hardware engines 1400, and a memory 1500.

The security core 1100 may be a processing unit configured to execute security-related firmware or software. The security core 1100 may verify the security state during the boot process of the chiplet 100 or verify the security state of running firmware (including boot firmware) or software to maintain integrity.

Specifically, the security core 1100 may include a CPU. This CPU may, for example, execute the first bootloader 1200 in the initial stage of booting to set the security state of the chiplet 100 and respond to security requests from external devices such as the host device 20 and the normal domain 2000.

The first bootloader 1200 is a bootloader that is executed when the boot process is initiated. The first bootloader 1200 is an immutable firmware fixed in hardware and may include ROM code.

Specifically, when power is supplied to the chiplet 100, the first bootloader 1200 can be automatically executed first by the security core 1100. After the first bootloader 1200 is executed, a hardware initialization process including clock and power settings, interface initialization, etc., can be performed. Subsequently, the loading of the second bootloader 1320 and an integrity verification on the second bootloader 1320 can be performed. If the integrity verification is successful, the first bootloader 1200 loads and executes the second bootloader 1320, and if the integrity verification fails, it can stop the boot process to block security threats.

The immutable memory 1300 is a memory that can be programmed one-time and may be implemented, for example, as a One-Time Programmable (OTP) memory. Data is written to the immutable memory 1300 only once during its manufacturing stage or initial provisioning process, and thereafter it cannot be modified or deleted, thus ensuring the immutability and integrity of the stored information.

Specifically, the immutable memory 1300 is placed within the secure domain 1000 and configured to be accessible only by the security core 1100, thereby preventing unauthorized tampering from the outside. In the boot sequence, the security core 1100 can initialize a security configuration 1330 by referring to the data stored in the immutable memory 1300 and perform an integrity verification procedure to proceed to the next boot stage.

The security hardware engines 1400 are a configuration for accelerating various security operations with the dedicated hardware within the chiplet 100, and can efficiently process security operations such as hash operations, digital signature generation and verification, and symmetric key encryption and decryption (e.g., AES).

Specifically, the hash operations can be used to verify the integrity of data by generating a hash value of a specific length from input data. For example, in the case of a SHA-384 hash operation, the output length is 384 bits, and it can be used to sign and verify certificates in X.509 format. The digital signature is a data result generated or verified using a pair of a public key and a private key, and can be used to verify and authenticate the integrity of a system. The Advanced Encryption Standard (AES) algorithm may be a symmetric key method that encrypts and decrypts data with the same key.

The memory 1500 is a space for storing data for the security core 1100 or other security-related circuits to perform tasks within the secure domain 1000, and may be implemented, for example, as Static Random Access Memory (SRAM). Specifically, to perform security tasks within the secure domain 1000, operations can be performed by storing security-related data in the memory 1500 and then referring to or updating that data.

Referring to FIG. 3, the normal domain 2000 may include at least one of a PCIe subsystem 2100, a UCIe subsystem 2200, a normal core 2300, neural network hardware engines 2400, a mailbox 2500, or a memory 2600. In other words, the PCIe subsystem 2100, the UCIe subsystem 2200, the normal core 2300, the neural network hardware engines 2400, the mailbox 2500, and the memory 2600 are exemplary components, and each component may be optionally included in the normal domain 2000. For example, the PCIe subsystem 2100 may be included only in the first chiplet 100_1 which communicates directly with the host device 20, and not in the second chiplet 100_2, the third chiplet 100_3, and the fourth chiplet 100_4.

The PCIe subsystem 2100 may be a module specifically designed to enable the electronic device 10 to perform high-speed data communication with the host device 20 through the second interface 50, which includes the PCIe interface. The PCIe subsystem 2100 may be installed, for example, in the first chiplet 100_1 to serve as the main interface to the host device 20.

The UCIe subsystem 2200 may be a module specifically designed to implement the first interface 40, which includes the UCIe interface for connecting the chiplets 100 to each other, in other words, for interconnecting the first to fourth chiplets 100_1 to 100_4. The UCIe subsystem 2200 may be installed in all of the first to fourth chiplets 100_1 to 100_4 to implement the inter-chiplet interface, that is the interface for connecting the chiplets 100 to each other.

The normal core 2300 is a general-purpose processor configured to provide intermediate control between the host device 20 and the neural network hardware engines 2400, and may be, for example, a CPU. When the host device 20 requests a processing job through the second interface 50, the normal core 2300 can receive and interpret the request and convert it into a format of commands and data that can be directly understood by the neural network hardware engines 2400 or other hardware accelerators. Specifically, the normal core 2300 can execute firmware to manage the initialization, job scheduling, data transfer control, and result collection of the neural network hardware engines 2400, and perform status reporting to the host device 20 when necessary.

The neural network hardware engines 2400 are modules that accelerate the operations of an artificial neural network model with the dedicated hardware, and may be, for example, an NPU. The neural network hardware engines 2400 can perform operations that are frequently performed in the inference and training processes of deep learning, such as large-scale matrix operations, tensor operations, and vector operations, at high speed through a parallel processing structure. Specifically, the neural network hardware engines 2400 can receive operation commands and input data from the normal core 2300 and perform parallel operations by utilizing the mailbox 2500 and the memory 2600. In addition, the neural network hardware engines 2400 can transfer the operation results to the normal core 2300 or other modules after performing the parallel operations.

The mailbox 2500 may be a shared memory-based module that supports asynchronous data exchange between the chiplets 100 or between the chiplet 100 and the host device 20. A sending module can write specific data to the mailbox 2500, and a receiving module can then read and process that data from the mailbox 2500 when necessary.

The memory 2600 may be a volatile memory used by the normal core 2300, the neural network hardware engines 2400, etc., to store or retrieve data necessary for their tasks. For example, the memory 2600 may be implemented as DRAM, SRAM, or a combination thereof, and can store intermediate data generated during operations, instructions, parameters, and buffer data. The immutable memory 1300 shown in FIG. 3 is described in detail with reference to FIGS. 4A and 4B.

Figure 4A:
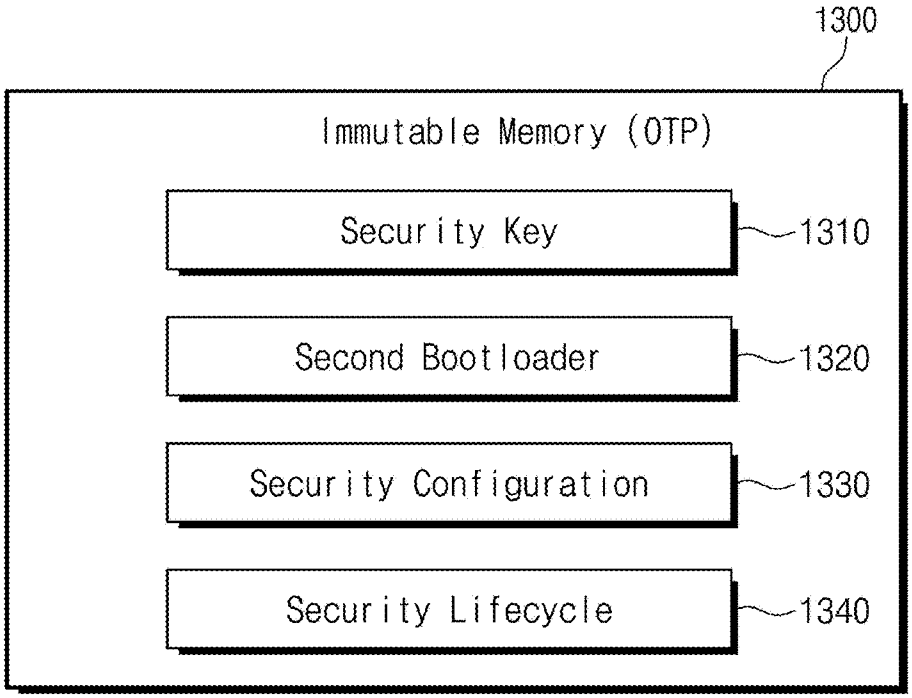
FIG. 4A is a diagram for explaining a configuration of an immutable memory according to embodiments of the present disclosure.
Figure 4B:
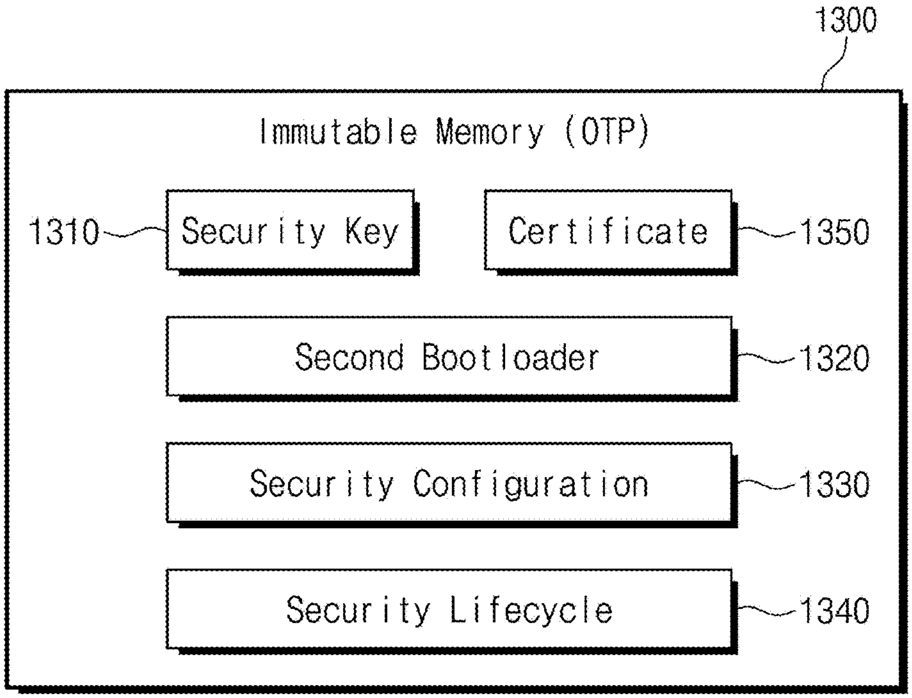
FIG. 4B is a diagram for explaining a configuration of an immutable memory according to embodiments of the present disclosure.

FIGS. 4A and 4B are diagrams for explaining configurations of an immutable memory according to embodiments of the present disclosure.

Referring to FIG. 4A, the immutable memory 1300 may store at least one of a security key 1310, a second bootloader 1320, a security configuration 1330, or a security lifecycle 1340. In other words, the security key 1310, the second bootloader 1320, the security configuration 1330, and the security lifecycle 1340 are exemplary components, and each component may be optionally included in the immutable memory 1300. However, each of the first to fourth chiplets 100_1 to 100_4 may essentially include the security key 1310 and the second bootloader 1320 in order to execute boot firmware and attest to the security state of each of the first to fourth chiplets 100_1 to 100_4 or the security state of the boot firmware.

The security key 1310 may include not only the unique private key of the corresponding chiplet (e.g., the first chiplet 100_1) but also the public keys corresponding to the other chiplets (the second chiplet 100_2, the third chiplet 100_3, and the fourth chiplet 100_4) within the electronic device 10. These public keys are stored in the immutable memory 1300, and when a verifier chiplet (e.g., the first chiplet 100_1) receives data from the attester chiplets (e.g., the second chiplet 100_2, the third chiplet 100_3, and the fourth chiplet 100_4) to be verified by the verifier chiplet, it can perform verification using the public keys corresponding to each of the attester chiplets, thereby ensuring the integrity and reliability of the electronic device 10.

The second bootloader 1320 may be a programmable firmware that is executed for the first time after the execution of the first bootloader 1200. The second bootloader 1320 is executed after its integrity is verified by the first bootloader 1200, and it can load and execute application firmware or operating system software. Although FIGS. 4A and 4B show the second bootloader 1320 as being stored in the immutable memory 1300, it may also be stored in the mutable memory 30 outside the electronic device 10 in FIG. 1.

The security configuration 1330 are a configuration that sets or defines the security policies and the status of security functions related to the operation of the chiplet 100, and may be recorded during the manufacturing stage or initial setup stage of the chiplet 100. Since the security configuration 1330 are stored in the immutable memory 1300, they cannot be changed after being written once, thus they can be protected from forgery or tampering attacks. As security configuration 1330, for example, an activated security mode such as whether Federal Information Processing Standards (FIPS) mode is enabled, or whether the debugging interface is disabled (Debugging Interface Disable) may be set or defined. In addition, as the security configuration 1330, the setting status of security functions, such as whether PCIe Integrity and Data Encryption (IDE) is enabled or whether memory encryption is enabled, may be set or defined. Furthermore, as the security configuration 1330, for example, the register and memory access policy of the chiplet 100 may be set or defined.

The security lifecycle 1340 defines the security policies and privilege levels applied at each stage such as manufacturing, authentication, initialization, and operation of the chiplet 100, and can control the chiplet 100 to perform certain functions only in allowed stages. For example, access for testing and debugging of the chiplet 100 may be allowed during the manufacturing stage of the chiplet 100, and access related to the boot process may be allowed during the operation stage of the chiplet 100.

Referring to FIG. 4B, the immutable memory 1300 may further include a certificate 1350. The certificate 1350 is electronic attestation data for verifying the identity and security state of the chiplet 100, and may include, for example, a digital certificate in X.509 format. The certificate 1350 includes information such as the Chiplet Unique ID and public key of the corresponding chiplet 100, and may be stored and managed in the immutable memory 1300 inside the secure domain 1000 of the chiplet 100. The configuration of the certificate 1350 will be described in detail with reference to FIG. 5.

Figure 5:
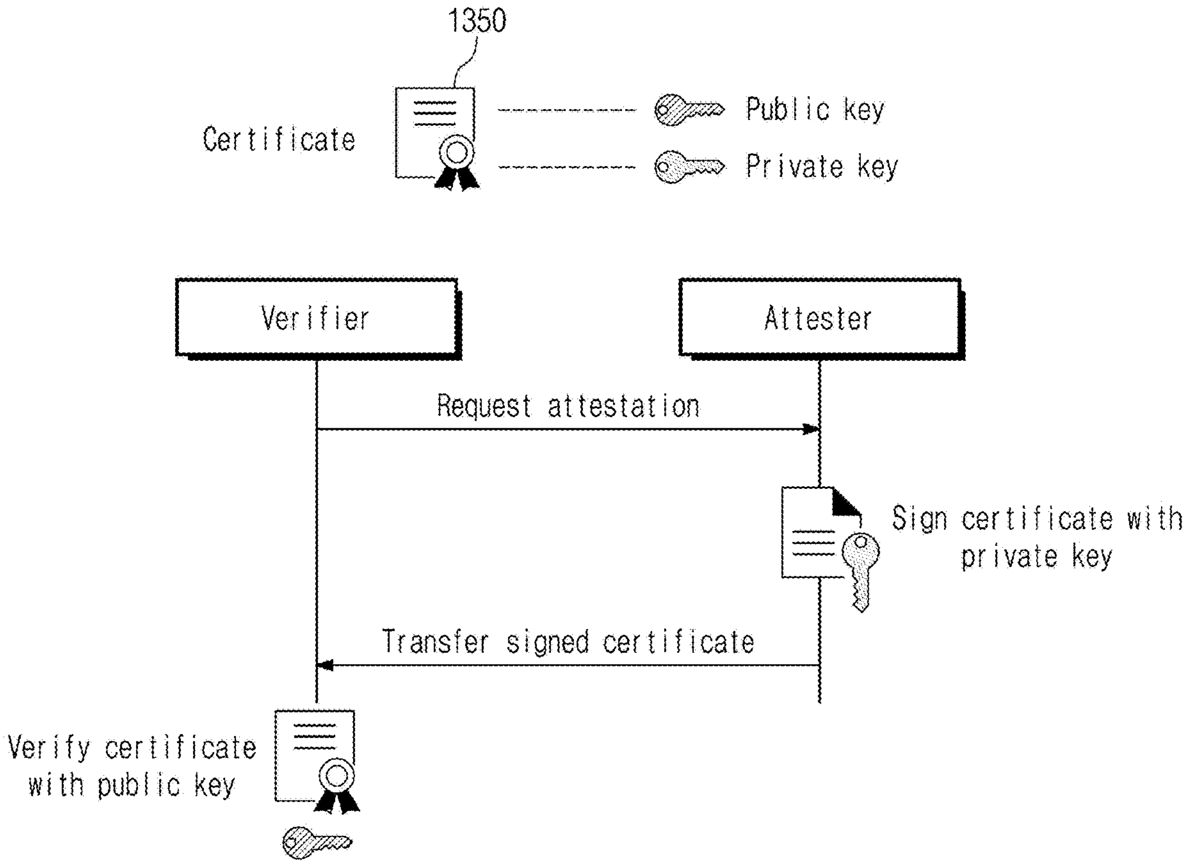
FIG. 5 is a diagram for explaining a configuration for signing with a certificate according to embodiments of the present disclosure.

FIG. 5 is a diagram for explaining a configuration for signing with a certificate according to embodiments of the present disclosure.

Referring to FIG. 5, the certificate 1350 can be used to verify the identity and security state of the chiplet 100. For example, the certificate 1350 in X.509 format may include a chiplet unique identifier, an algorithm used for signing the certificate 1350 (e.g., SHA-384), a public key of an owner of the certificate 1350, a value (or data) signed with a private key of the owner of the certificate 1350, etc. Here, the public key and private key can be configured as a corresponding key pair.

In addition, referring to FIG. 5, for example, there may be a verifier chiplet (or verifier device) ("Verifier" in FIG. 5) configured to verify the security state, etc., of the chiplet 100, and an attester chiplet (or attester device) ("Attester" in FIG. 5) configured to attest to its security state in response to a request from the verifier chiplet. Explaining the authentication method by the certificate 1350 with reference to FIG. 5, first, the verifier chiplet can request the attester chiplet to attest to its security state ("Request attestation" in FIG. 5). In response to the request from the verifier chiplet, the attester chiplet can generate the certificate 1350 including its chiplet unique identifier and public key, and encrypt or sign it with its private key ("Sign certificate with private key" in FIG. 5). When the attester chiplet transmits the signed certificate 1350 to the verifier chiplet ("Transfer signed certificate" in FIG. 5), the verifier chiplet can decrypt or verify the signed certificate with the public key corresponding to the private key used for encryption or signing ("Verify certificate with public key" in FIG. 5). If the verification is successful, the corresponding certificate 1350 can be authenticated as being intact. The request for attestation of the security state by the verifier chiplet, the signing of the certificate by the attester chiplet, the verification of the certificate by the verifier chiplet, etc., as described above, may be performed by the security core 1100, the security hardware engines 1400, the normal core 2300, the neural network hardware engines 2400, etc., of each chiplet 100, but the present disclosure is not limited thereto.

According to embodiments of the present disclosure, each of the first to fourth chiplets 100_1 to 100_4 can attest to its security state by signing with a security key that includes a private key, in response to a request for attestation of the security state from an external device. Regarding the authentication of the chiplet 100, the first chiplet 100_1 can act as the verifier chiplet to request an attestation of the security state to each of the second chiplet 100_2, the third chiplet 100_3, and the fourth chiplet 100_4, and each of the second chiplet 100_2, the third chiplet 100_3, and the fourth chiplet 100_4 can act as the attester chiplet to attest to its own security state. Furthermore, regarding the authentication of the electronic device 10 including the first to fourth chiplets 100_1 to 100_4, the host device 20 can act as the verifier device to request an attestation of the security state to the first chiplet 100_1, and the first chiplet 100_1 can act as the attester chiplet to attest to the security state of the entire electronic device 10, including the first chiplet 100_1. In other words, the first chiplet 100_1 can act as both the verifier chiplet and the attester chiplet. Hereinafter, a specific method for verifying (authenticating) the security state will be described.

Figure 6:
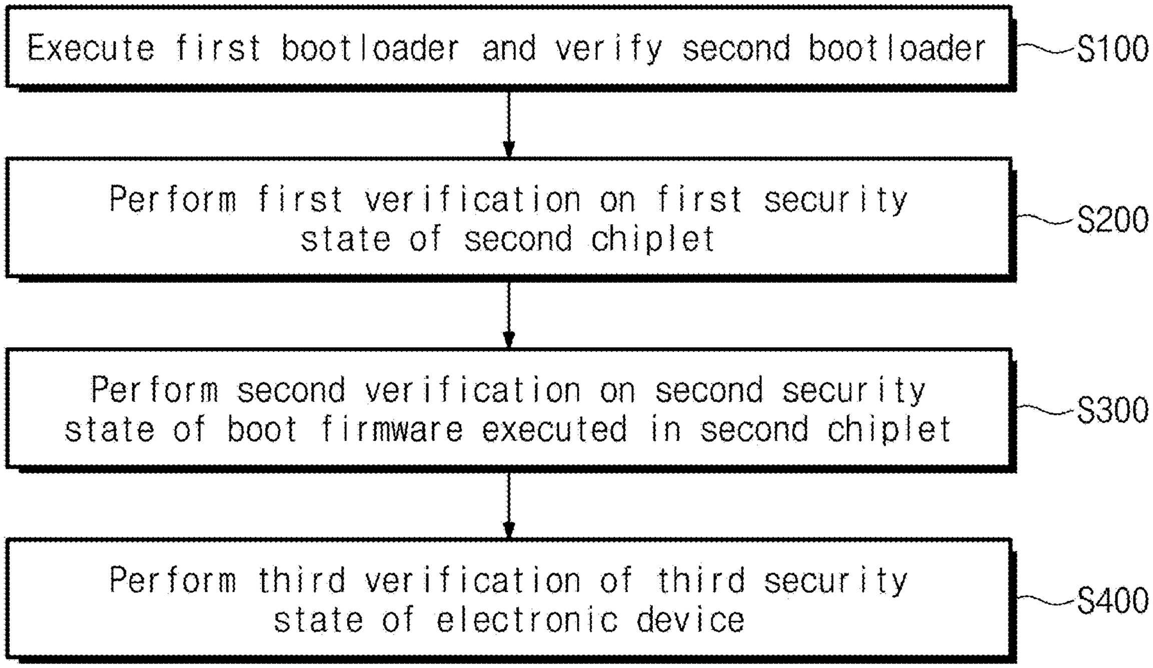
FIG. 6 is a flowchart for explaining a method for authenticating a security state of a chiplet according to embodiments of the present disclosure.

FIG. 6 is a flowchart for explaining a method for authenticating a security state of a chiplet according to embodiments of the present disclosure.

Referring to FIG. 6, each of the first to fourth chiplets 100_1 to 100_4 can execute the first bootloader 1200 and perform an integrity verification on the second bootloader 1320 (S100). If the integrity verification is successful, the first chiplet 100_1 can perform a first verification on the first security state of each of the second chiplet 100_2, the third chiplet 100_3, and the fourth chiplet 100_4 (S200). If the first verification is successful, the first chiplet 100_1 can perform a second verification on the second security state of the boot firmware executed in each of the second chiplet 100_2, the third chiplet 100_3, and the fourth chiplet 100_4 (S300). If the second verification is successful, a third verification on the third security state of the electronic device 10 can be performed by the host device 20, which is connected to the first chiplet 100_1 by the second interface 50 (S400).

Figure 7:
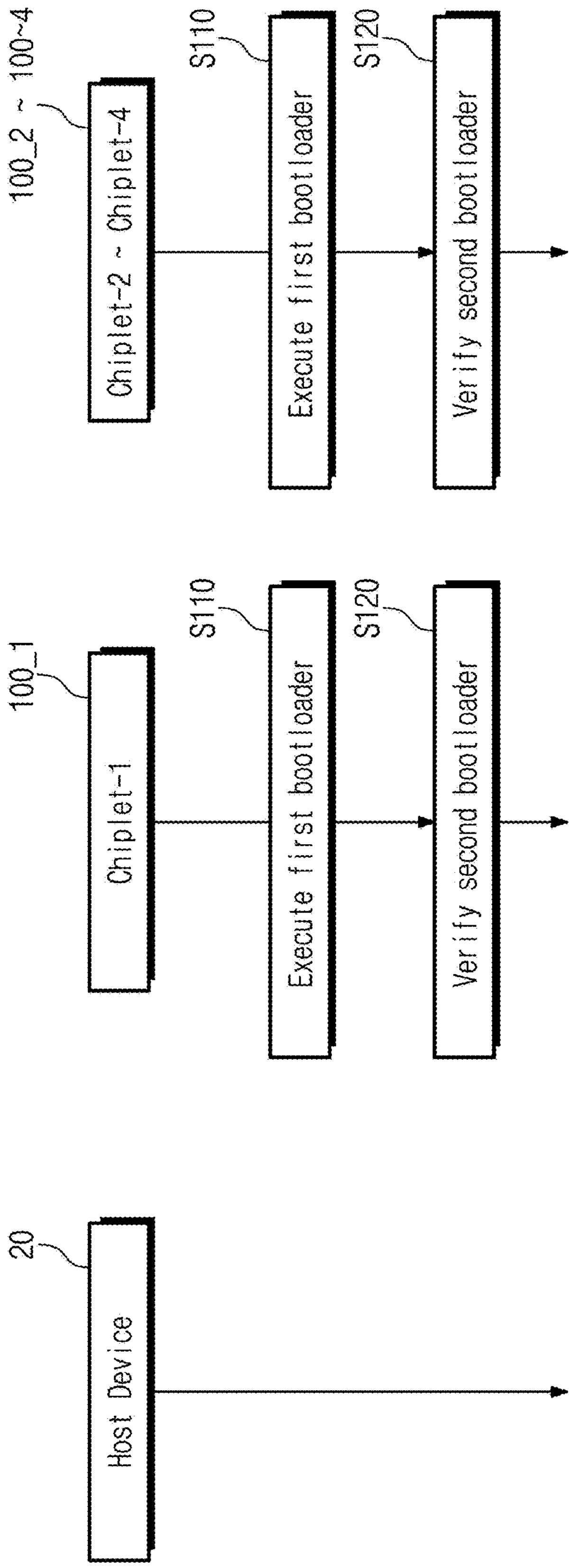
FIG. 7 is a flowchart for explaining an operation of a first bootloader and a second bootloader according to embodiments of the present disclosure.

FIG. 7 is a flowchart for explaining an operation of a first bootloader and a second bootloader according to embodiments of the present disclosure. FIG. 7 is the flowchart that specifically explains step S100 of FIG. 6.

Referring to FIG. 7, each of the first to fourth chiplets 100_1 to 100_4 can execute the first bootloader 1200 when initiating the boot process (S110). When power is supplied to the chiplet 100, the first bootloader 1200 can be automatically executed first by the security core 1100.

After step S110, each of the first to fourth chiplets 100_1 to 100_4 can load the second bootloader 1320 and perform an integrity verification on the second bootloader 1320 by the first bootloader 1200 (S120). If the integrity verification is successful, the first bootloader 1200 can load and allow the second bootloader 1320 to be executed, and if the integrity verification fails, it can stop the boot process. Steps S110 and S120 can be performed in the same manner in each of the first to fourth chiplets 100_1 to 100_4.

Figure 8:
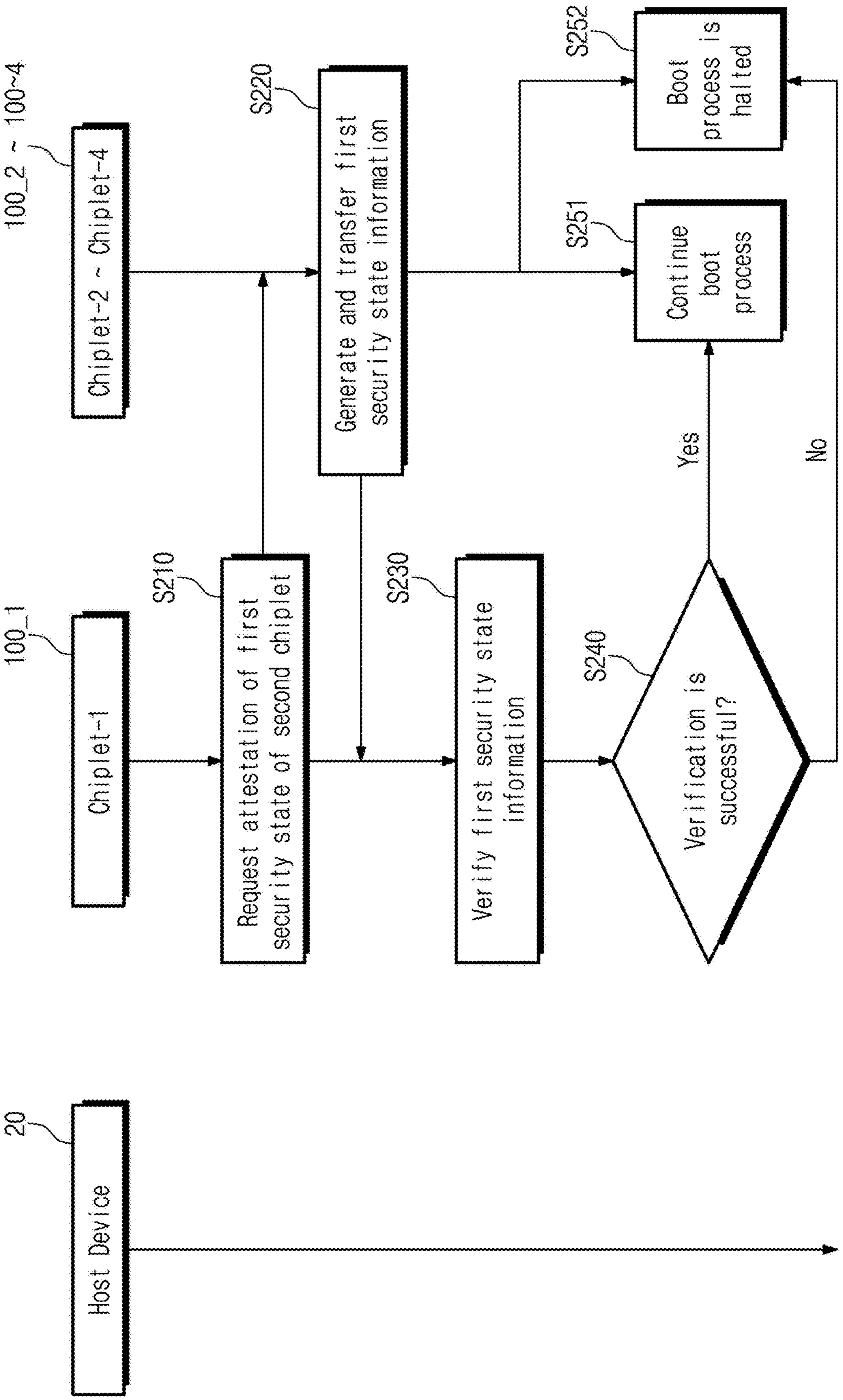
FIG. 8 is a flowchart for explaining a first verification process according to embodiments of the present disclosure.

FIG. 8 is a flowchart for explaining a first verification process according to embodiments of the present disclosure. FIG. 8 is the flowchart that specifically explains step S200 of FIG. 6.

If the integrity verification on the second bootloader 1320 is successful in step S120 of FIG. 7, the first chiplet 100_1 can perform a first verification on the first security state of each of the second chiplet 100_2, the third chiplet 100_3, and the fourth chiplet 100_4. The first security state may include the integrity state of each of the second chiplet 100_2, the third chiplet 100_3, and the fourth chiplet 100_4. By performing the first verification on the first security state, it is possible to prevent each of the second chiplet 100_2, the third chiplet 100_3, and the fourth chiplet 100_4 from malfunctioning or being maliciously altered, and to ensure the reliability of each of the second chiplet 100_2, the third chiplet 100_3, and the fourth chiplet 100_4.

Explaining the operation of the first verification in detail with reference to FIG. 8, first, the first chiplet 100_1 can request an attestation of the first security state of each of the second chiplet 100_2, the third chiplet 100_3, and the fourth chiplet 100_4 (S210) to them. In other words, the first chiplet 100_1 can request an attestation of the first security state of the second chiplet 100_2 to the second chiplet 100_2, an attestation of the first security state of the third chiplet 100_3 to the third chiplet 100_3, and an attestation of the first security state of the fourth chiplet 100_4 to the fourth chiplet 100_4. The first chiplet 100_1 can request the attestation of the first security state to each of the second chiplet 100_2, the third chiplet 100_3, and the fourth chiplet 100_4 simultaneously or sequentially.

For example, step S210 can be performed simultaneously when the integrity verification for each of the first to fourth chiplets 100_1 to 100_4 is successful, or step S210 can be performed according to the order in which the integrity verification for each of the first to fourth chiplets 100_1 to 100_4 is successful. Also, for example, the first chiplet 100_1 can perform step S210 for any one chiplet that has successfully passed the integrity verification, and then, after the first verification is successful (Yes in step S240), perform step S210 for another chiplet that has successfully passed the integrity verification.

In response to the request from the first chiplet 100_1 in step S210, each of the second chiplet 100_2, the third chiplet 100_3, and the fourth chiplet 100_4 can generate first security state information based on the security key 1310 and transfer it to the first chiplet 100_1 (S220). Here, the first security state information may include at least one of a chiplet unique identifier, a certificate 1350, firmware information, booting information, version information, or a security configuration 1330 of each of the second chiplet 100_2, the third chiplet 100_3, and the fourth chiplet 100_4. Generating the first security state information based on the security key 1310 may be performed, for example, in a manner in which each of the second chiplet 100_2, the third chiplet 100_3, and the fourth chiplet 100_4 encrypts or signs its own certificate 1350 with a private key, as described in FIG. 5. Descriptions of configurations identical to those described in FIG. 5 are omitted.

Explaining the first security state information in detail, the firmware information may include the hash value of the firmware and information about the firmware running inside each of the second chiplet 100_2, the third chiplet 100_3, and the fourth chiplet 100_4.

The booting information may include, for example, the execution order of the bootloader, whether integrity verification was performed during booting, whether the integrity verification during booting was successful, the loaded state during booting, etc, for each of the second chiplet 100_2, the third chiplet 100_3, and the fourth chiplet 100_4.

The version information may include, for example, the version of the firmware executed in each of the second chiplet 100_2, the third chiplet 100_3, and the fourth chiplet 100_4, the chiplet silicon revision, and the security patch level indicating the time of the latest security update.

The descriptions of the chiplet unique identifier, the security configuration 1330, and the certificate 1350 are omitted as they overlap with the relevant descriptions in FIGS. 4A, 4B, and 5.

Referring back to FIG. 8, upon receiving the first security state information in step S220, the first chiplet 100_1 can verify the first security state information for each of the second chiplet 100_2, the third chiplet 100_3, and the fourth chiplet 100_4 (S230). Verifying the first security state information may be performed, for example, by decrypting or verifying the signed certificate 1350 with the public key corresponding to the private key used for encryption or signing, as described in FIG. 5. Descriptions of configurations identical to those described in FIG. 5 are omitted. This allows for checking whether the first security state information has been tampered with.

As a result of the first verification on the first security state information in step S230, if the first verification is successful (Yes in S240), the first chiplet 100_1 can allow each of the second chiplet 100_2, the third chiplet 100_3, and the fourth chiplet 100_4 to continue the boot process (S251). On the other hand, if the first verification fails (No in S240), the first chiplet 100_1 can disable at least one of the plurality of first interfaces 40, stop (halt) the boot process, and transmit log information about the boot failure to the host device 20 (S252). This can prevent security threats and maintain the integrity of each of the second chiplet 100_2, the third chiplet 100_3, and the fourth chiplet 100_4. In addition, by transmitting the log information about the boot failure to the host device 20, it enables security analysis and identification of the cause of the failure.

Steps S210, S220, S230, S240, and S251 or S252 of FIG. 8 can be performed in the same manner in each of the first to fourth chiplets 100_1 to 100_4. In the case of the first chiplet 100_1, the first verification on the first security state of the first chiplet 100_1 may be performed by the host device 20 or another external device. In this case, the above descriptions for the second chiplet 100_2, the third chiplet 100_3, and the fourth chiplet 100_4 may be applied equally to the first chiplet 100_1. The first verification on the first security state of the first chiplet 100_1 may be performed at any of steps S200 to S400 of FIG. 6, but the present disclosure is not limited thereto.

Figure 9:
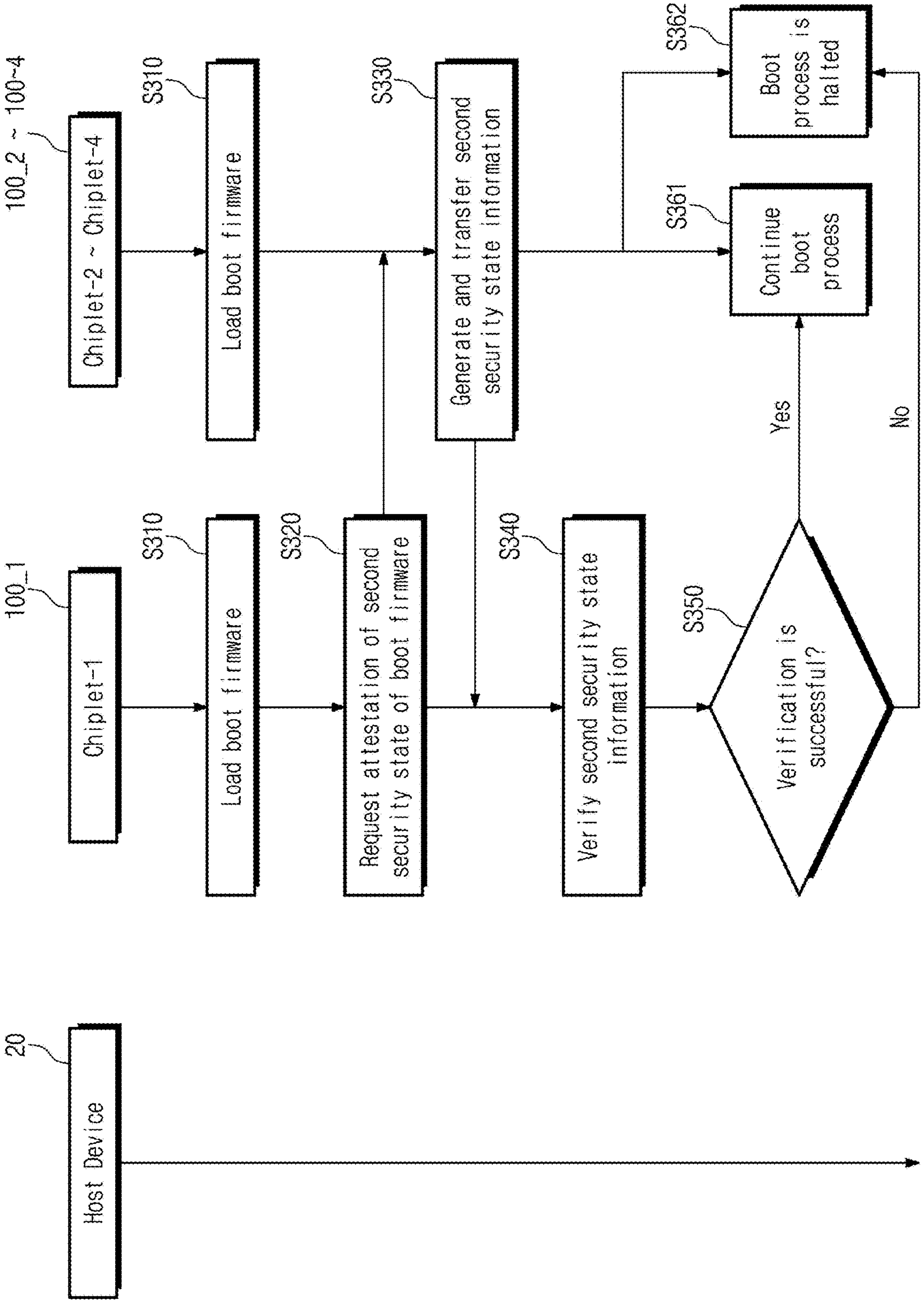
FIG. 9 is a flowchart for explaining a second verification process according to embodiments of the present disclosure.

FIG. 9 is a flowchart for explaining a second verification process according to embodiments of the present disclosure. FIG. 9 is a flowchart that specifically explains step S300 of FIG. 6.

While the boot process continues according to step S251 of FIG. 8 (for example, in the final stage of the boot sequence), each of the first to fourth chiplets 100_1 to 100_4 can load the boot firmware by the second bootloader 1320 (S310). Here, step S310 may be performed after all of the second chiplet 100_2, the third chiplet 100_3, and the fourth chiplet 100_4 have reached step S251, or after all of the first to fourth chiplets 100_1 to 100_4 have reached step S251. The boot firmware may be firmware or software that initializes the operating environment of the corresponding chiplet and enables a higher-level application or operating system to be executed.

After step S310, the first chiplet 100_1 can perform a second verification on the second security state of the boot firmware executed in each of the second chiplet 100_2, the third chiplet 100_3, and the fourth chiplet 100_4. The second security state may include the integrity state of the boot firmware running in each of the second chiplet 100_2, the third chiplet 100_3, and the fourth chiplet 100_4. By performing the second verification on the second security state, the integrity of the corresponding boot firmware can be verified, and the security thereof can be enhanced.

Explaining the operation of the second verification in detail with reference to FIG. 9, first, the first chiplet 100_1 can request an attestation of the second security state to each of the second chiplet 100_2, the third chiplet 100_3, and the fourth chiplet 100_4 (S320). In other words, the first chiplet 100_1 can request an attestation of the second security state of the boot firmware running in the second chiplet 100_2 to the second chiplet 100_2, an attestation of the second security state of the boot firmware running in the third chiplet 100_3 to the third chiplet 100_3, and an attestation of the second security state of the boot firmware running in the fourth chiplet 100_4 to the fourth chiplet 100_4. The first chiplet 100_1 can request the attestation of the second security state to each of the second chiplet 100_2, the third chiplet 100_3, and the fourth chiplet 100_4 simultaneously or sequentially.

For example, the first chiplet 100_1 can perform step S320 simultaneously when step S310 is completed for each of the second chiplet 100_2, the third chiplet 100_3, and the fourth chiplet 100_4, or perform step S320 according to the order in which step S310 is completed for each of the second chiplet 100_2, the third chiplet 100_3, and the fourth chiplet 100_4. Also, for example, the first chiplet 100_1 can perform step S320 for any one chiplet that has completed step S310, and then, after the second verification is successful (Yes in step S350), perform step S320 for another chiplet that has completed step S310.

In response to the request from the first chiplet 100_1 in step S320, each of the second chiplet 100_2, the third chiplet 100_3, and the fourth chiplet 100_4 can generate second security state information based on the security key 1310 and transfer it to the first chiplet 100_1 (S330). Here, the second security state information may include at least one of runtime information or integrity information of the boot firmware executed in each of the second chiplet 100_2, the third chiplet 100_3, and the fourth chiplet 100_4. Generating the second security state information based on the security key 1310 may be performed, for example, in a manner in which each of the second chiplet 100_2, the third chiplet 100_3, and the fourth chiplet 100_4 encrypts or signs its own certificate 1350 with a private key, as described in FIG. 5. Descriptions of configurations identical to those described in FIG. 5 are omitted.

Explaining the second security state information in detail, the runtime information of the boot firmware may include the clock and voltage setting information, and the operating state of the normal core 2300, the neural network hardware engines 2400, etc., while the boot firmware is running. In addition, the runtime information of the boot firmware may include security-related state information during actual operation after booting, such as the execution environment of the boot firmware, the processes activated during execution, the execution memory state, and operation logs.

The integrity information may include hash values for the code area and the data area of the boot firmware, signature verification results, or verification result values obtained during the boot process.

Referring back to FIG. 9, upon receiving the second security state information in step S330, the first chiplet 100_1 can verify the second security state information for each of the second chiplet 100_2, the third chiplet 100_3, and the fourth chiplet 100_4 (S340). Verifying the second security state information may be performed, for example, by decrypting or verifying the signed certificate 1350 with the public key corresponding to the private key used for encryption or signing, as described in FIG. 5. Descriptions of configurations identical to those described in FIG. 5 are omitted. This allows for checking whether the second security state information has been tampered with.

As a result of the second verification on the second security state information in step S340, if the second verification is successful (Yes in S350), the first chiplet 100_1 can allow each of the second chiplet 100_2, the third chiplet 100_3, and the fourth chiplet 100_4 to continue the boot process (S361). In other words, it can allow the normal operation of each of the second chiplet 100_2, the third chiplet 100_3, and the fourth chiplet 100_4. On the other hand, if the second verification fails (No in S350), the first chiplet 100_1 can disable at least one of the plurality of first interfaces 40, stop (halt) the boot process, and transmit log information about the boot failure to the host device 20 (S362). This can maintain the integrity of the boot firmware running in each of the second chiplet 100_2, the third chiplet 100_3, and the fourth chiplet 100_4. In addition, by transmitting the log information about the boot failure to the host device 20, it enables security analysis and identification of the cause of the failure.

Steps S310, S320, S330, S340, S350, and S361 or S362 of FIG. 9 can be performed in the same manner in each of the first to fourth chiplets 100_1 to 100_4. In the case of the first chiplet 100_1, the second verification on the second security state of the boot firmware executed in the first chiplet 100_1 may be performed by the host device 20 or another external device. In this case, the above descriptions for the second chiplet 100_2, the third chiplet 100_3, and the fourth chiplet 100_4 may be applied equally to the first chiplet 100_1. The second verification on the second security state of the boot firmware executed in the first chiplet 100_1 may be performed at any of steps S300 and S400 of FIG. 6, but the present disclosure is not limited thereto.

Figure 10:
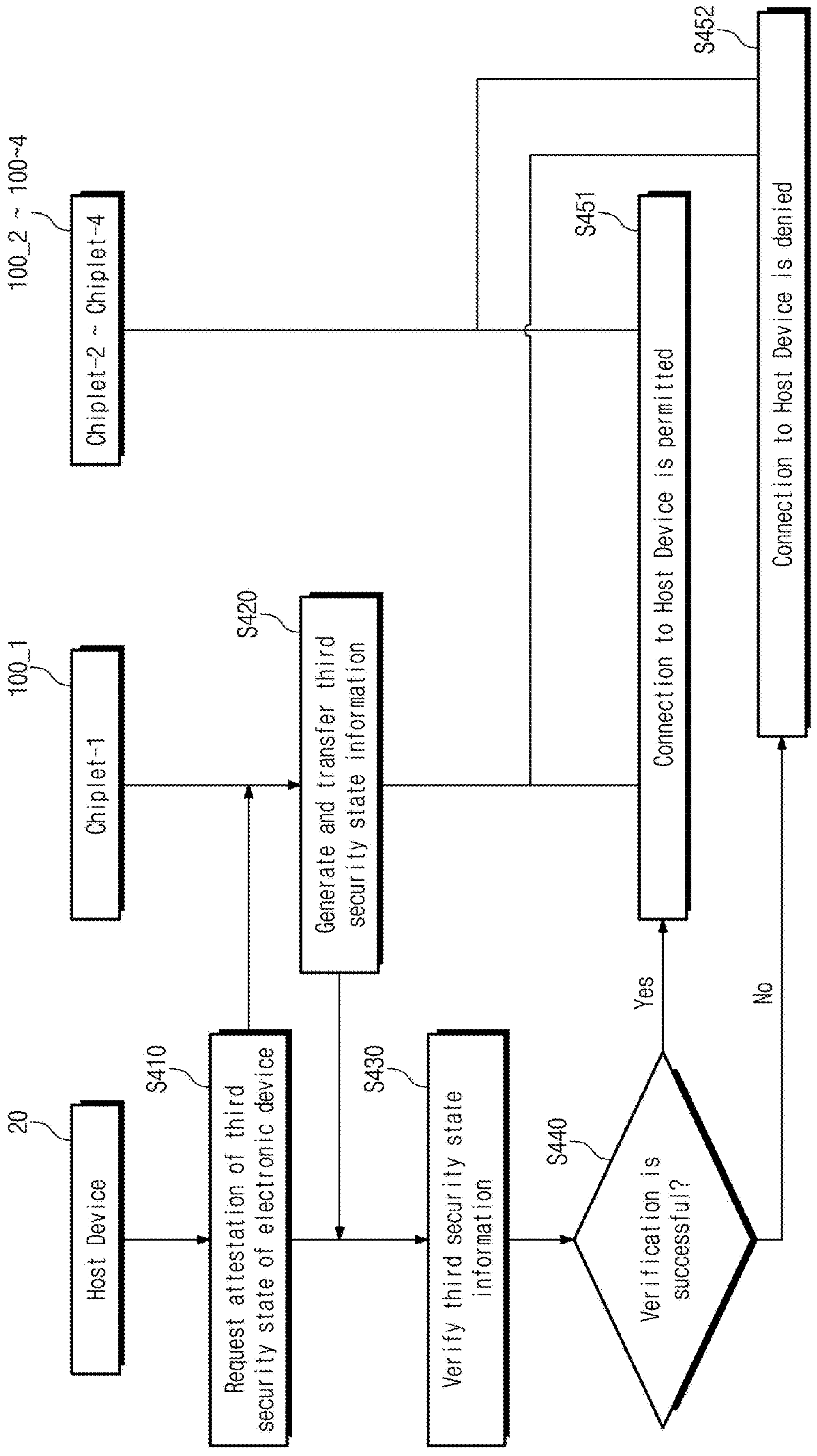
FIG. 10 is a flowchart for explaining a third verification process according to embodiments of the present disclosure.

FIG. 10 is a flowchart for explaining a third verification process according to embodiments of the present disclosure. FIG. 10 is a flowchart that specifically explains step S400 of FIG. 6.

After the boot process is normally completed according to step S361 of FIG. 9, a third verification on the third security state of the electronic device 10 may be performed by the host device 20. Here, step S410 may be performed after all of the second chiplet 100_2, the third chiplet 100_3, and the fourth chiplet 100_4 have reached step S361, or after all of the first to fourth chiplets 100_1 to 100_4 have reached step S361.

Explaining the operation of the third verification in detail with reference to FIG. 10, first, the host device 20 can request an attestation of the third security state to the first chiplet 100_1 (S410). The host device 20 can request the attestation of the third security state, for example, by transmitting a command stream to the first chiplet 100_1.

In response to the request from the host device 20 in step S410, the first chiplet 100_1 can generate third security state information based on the security key 1310 and transfer it to the host device 20 (S420). Here, the third security state information may include at least one of the first verification result or the second verification result for each of the first to fourth chiplets 100_1 to 100_4. Generating the third security state information based on the security key 1310 may be performed, for example, in a manner in which the first chiplet 100_1 encrypts or signs its own certificate 1350 with a private key, as described in FIG. 5. Descriptions of configurations identical to those described in FIG. 5 are omitted.

Upon receiving the third security state information in step S420, the host device 20 can verify the third security state information for each of the first to fourth chiplets 100_1 to 100_4 (S430). In other words, it can verify the third security state information for the entire electronic device 10 including the first to fourth chiplets 100_1 to 100_4. Verifying the third security state information may be performed, for example, by decrypting or verifying the signed certificate 1350 with the public key corresponding to the private key used for encryption or signing, as described in FIG. 5. Descriptions of configurations identical to those described in FIG. 5 are omitted. This allows for checking whether the third security state information has been tampered with.

As a result of the third verification on the third security state information in step S430, if the third verification is successful (Yes in S440), the host device 20 can permit the connection to the electronic device 10 (S451). On the other hand, if the third verification fails (No in S440), the host device 20 can deny the connection to the electronic device 10 (S452). Denying the connection between the electronic device 10 and the host device 20 may include restricting or blocking the connection between the electronic device 10 and the host device 20. This can block security attacks against the entire electronic device 10 and maintain its integrity.

Although FIG. 10 shows steps S410, S420, S430, S440, and S451 or S452 as being performed between the host device 20 and the first to fourth chiplets 100_1 to 100_4, the present disclosure is not limited thereto. For example, if the third verification is successful (Yes in S440), the host device 20 may instruct only the first chiplet 100_1 to connect the electronic device 10 and the host device 20, and then allow the electronic device 10 and the host device 20 to be connected. In addition, if the third verification fails (No in S440), the host device 20 may instruct only the first chiplet 100_1 to restrict or block the connection between the electronic device 10 and the host device 20, and then cause the connection between the electronic device 10 and the host device 20 to be restricted or blocked.

An embodiment in which the first verification on the first security state of the first chiplet 100_1 and the second verification on the second security state of the boot firmware executed in the first chiplet 100_1 are performed in step S400 may be performed after receiving the request for attestation of the third security state information from the host device 20 in step S410, and before transferring the third security state information to the host device 20 in step S420. However, the present disclosure is not limited thereto and may be configured in various ways within the scope of the problems to be solved by the present disclosure.

In embodiments of the present disclosure, components expressed as '~part, "~unit," ~block,' '~module,' '~component,' etc., can be implemented as hardware that performs specific functions. Such hardware may include, for example, a circuit that performs operations or circuitry which is a set of interconnected circuits to perform complex functions. Here, '~part,' '~unit,' '~block,' '~module,' '~component,' etc. perform specific functions and are not limited to software or hardware, and can be used to encompass data, components of software or hardware, or combinations thereof. Also, the structures, methods, operations, processes, algorithms, etc., according to various embodiments of the present disclosure can be implemented through various means such as hardware, firmware, software, or combinations thereof.

As described above, those skilled in the art to which the present disclosure pertains will recognize that the present disclosure can be implemented in various forms without changing its technical principles or essential features. Therefore, it should be understood that the above embodiments are illustrative and do not limit the scope of the present disclosure. The scope of the present disclosure is defined by the claims below rather than by the detailed description, and all modifications or variations based on the meaning and scope of the claims and equivalent concepts thereof should be construed as being included within the scope of the present disclosure.

The features and advantages described herein are merely illustrative, and many additional features and advantages will become apparent to those skilled in the art by referring to the drawings, specification, and claims. In addition, it should be noted that the language used in this specification has been chosen for readability and explanation, and is not necessarily chosen for the purpose of limiting or describing the subject matter of the present disclosure.

The descriptions of the above embodiments are provided for illustrative purposes and are not intended to limit the scope of the present disclosure in precise form. Those skilled in the art will understand that various modifications and variations are possible through the disclosure of the present disclosure.

Therefore, the scope of the present disclosure is not limited by the detailed description, but is defined by the claims herein. Accordingly, the embodiments of the present disclosure are illustrative and do not limit the scope of the present disclosure as set forth in the claims below.

What is claimed is:

1. An electronic device for authenticating a security state of a chiplet, comprising:

a first chiplet and one or more second chiplets connected to each other by a first interface;

wherein each of the first chiplet and the one or more second chiplets includes a first bootloader executed when starting a boot process and an immutable memory that is programmed one-time, wherein the immutable memory stores a security key and a second bootloader executed by the first bootloader, and wherein each of the first chiplet and the one or more second chiplets is configured to attest a security state by signing using the security key in response to a request for attestation of the security state from an external device.

2. The electronic device of claim 1, wherein each of the first chiplet and the one or more second chiplets is further configured to:

execute the first bootloader when starting the boot process; and by the first bootloader, load the second bootloader and perform an integrity verification on the second bootloader.

3. The electronic device of claim 2, wherein if the integrity verification is successful in each of the first chiplet and the one or more second chiplets, the first chiplet is further configured to perform a first verification on a first security state of each of the one or more second chiplets.

4. The electronic device of claim 3, wherein the first verification is performed in a manner in which:

the first chiplet requests an attestation of the first security state to each of the one or more second chiplets, in response to the request from the first chiplet, each of the one or more second chiplets generates first security state information based on the security key and transfers it to the first chiplet, and the first chiplet verifies the first security state information.

5. The electronic device of claim 4, wherein the first security state information includes at least one of a chiplet unique identifier, a certificate, firmware information, booting information, version information, or a security configuration of each of the one or more second chiplets.

6. The electronic device of claim 3, wherein the first chiplet is further configured to:

if the first verification is successful, allow each of the one or more second chiplets to continue the boot process, and if the first verification fails, disable the first interface, stop the boot process, and transmit log information about the boot failure to a host device.

7. The electronic device of claim 6, wherein during the continuation of the boot process, each of the first chiplet and the one or more second chiplets loads a boot firmware by the second bootloader, and the first chiplet is further configured to perform a second verification on a second security state of the boot firmware executed in each of the one or more second chiplets.

8. The electronic device of claim 7, wherein the second verification is performed in a manner in which:

the first chiplet requests an attestation of the second security state to each of the one or more second chiplets, in response to the request from the first chiplet, each of the one or more second chiplets generates second security state information based on the security key and transfers it to the first chiplet, and the first chiplet verifies the second security state information.

9. The electronic device of claim 8, wherein the second security state information includes at least one of runtime information or integrity information of the boot firmware.

10. The electronic device of claim 7, wherein the first chiplet is further configured to:

if the second verification is successful, allow each of the one or more second chiplets to complete the boot process, and if the second verification fails, disable the first interface, stop the boot process, and transmit log information about the boot failure to the host device.

11. The electronic device of claim 10, wherein the first chiplet is connected to the host device by a second interface, and wherein after the boot process is completed, in response to a request for attestation of a third security state of the electronic device from the host device, the first chiplet is further configured to generate third security state information based on the security key and transmit it to the host device.

12. A method for authenticating a security state of a chiplet by an electronic device, wherein the electronic device includes a first chiplet and one or more second chiplets connected to each other by a first interface, wherein each of the first chiplet and the one or more second chiplets includes a first bootloader executed when starting a boot process and an immutable memory that is programmed one-time, wherein the immutable memory stores a security key and a second bootloader executed by the first bootloader, and wherein the method comprises:

by each of the first chiplet and the one or more second chiplets, executing the first bootloader and performing an integrity verification on the second bootloader;

by the first chiplet, performing a first verification on a first security state of each of the one or more second chiplets;

by the first chiplet, performing a second verification on a second security state of a boot firmware executed in each of the one or more second chiplets; and by a host device connected to the first chiplet by a second interface, performing a third verification on a third security state of the electronic device.

13. The method of claim 12, wherein the performing the first verification includes:

by the first chiplet, requesting an attestation of the first security state to each of the one or more second chiplets;

in response to the request from the first chiplet, by each of the one or more second chiplets, generating first security state information based on the security key and transferring it to the first chiplet; and by the first chiplet, verifying the first security state information.

14. The method of claim 12, further comprising, after the performing the first verification:

if the first verification is successful, by the first chiplet, allowing each of the one or more second chiplets to continue the boot process; and if the first verification fails, by the first chiplet, disabling the first interface, stopping the boot process, and transmitting log information about the boot failure to the host device.

15. The method of claim 12, wherein the performing the second verification includes:

by the first chiplet, requesting an attestation of the second security state to each of the one or more second chiplets;

in response to the request from the first chiplet, by each of the one or more second chiplets, generating second security state information based on the security key and transferring it to the first chiplet; and by the first chiplet, verifying the second security state information.

16. The method of claim 12, further comprising, after the performing the second verification:

if the second verification is successful, by the first chiplet, allowing each of the one or more second chiplets to complete the boot process; and if the second verification fails, by the first chiplet, disabling the first interface, stopping the boot process, and transmitting log information about the boot failure to the host device.

17. The method of claim 12, wherein the performing the third verification includes:

by the host device, requesting an attestation of the third security state of the electronic device to the first chiplet;

in response to the request from the host device, by the first chiplet, generating third security state information based on the security key and transferring it to the host device; and by the host device, verifying the third security state information.

18. The method of claim 12, further comprising, after the performing the third verification:

if the third verification is successful, by the host device, allowing a connection between the electronic device and the host device; and if the third verification fails, by the host device, denying the connection between the electronic device and the host device.

* * * * *